United States Patent [19]

Enke et al.

[11] Patent Number: 4,762,730

[45] Date of Patent: Aug. 9, 1988

[54] METHOD FOR PRODUCING TRANSPARENT PROTECTIVE COATINGS FROM SILICON COMPOUNDS

[75] Inventors: Knut Enke, Johannesberg; Walter Zultzke, Hanau-Wachenbuchen, both of Fed. Rep. of Germany

[73] Assignee: Leybold-Heraeus GmbH, Cologne, Fed. Rep. of Germany

[21] Appl. No.: 903,511

[22] Filed: Sep. 3, 1986

[30] Foreign Application Priority Data

Jul. 19, 1986 [DE] Fed. Rep. of Germany ....... 3624467

[51] Int. Cl.$^4$ .......................... B05D 3/06; B05D 5/06
[52] U.S. Cl. ........................................ 427/40; 427/41; 427/164; 427/255.3; 427/255.6
[58] Field of Search ............... 427/40, 41, 164, 255.3, 427/255.6, 322, 162

[56] References Cited

U.S. PATENT DOCUMENTS

| | | | |
|---|---|---|---|
| 4,137,365 | 1/1979 | Fletcher et al. | 427/40 |
| 4,247,577 | 1/1981 | Imada et al. | 427/40 |
| 4,260,647 | 4/1981 | Wang et al. | 427/40 |
| 4,396,641 | 8/1983 | Imada et al. | 427/40 |
| 4,533,369 | 8/1985 | Okita | 427/41 |
| 4,562,091 | 12/1985 | Sachdev et al. | 427/41 |
| 4,599,243 | 7/1986 | Sachdev et al. | 427/41 |
| 4,601,950 | 7/1986 | Iida et al. | 427/41 |
| 4,639,379 | 1/1987 | Asai et al. | 427/41 |

FOREIGN PATENT DOCUMENTS 53-8669  1/1978  Japan ....................... 427/40

OTHER PUBLICATIONS

Profile Booklet 1984, 83-785844/41, Ref. JP 30174-83; (abstract).
Profile Booklet 1984, 83-785845/41, Ref. JP 30175-83; (abstract).
Journal of Polymer Science, Polymer Chemistry Edition, vol. 21, 1983, S.2335-2343.
J. Phys. E: Sci. Instrum., vol. 12, 1979, S.159-167.
Applied Optics, vol. 17, No. 16, Aug. 15, 1978, S.2645-2647.

Primary Examiner—Sadie L. Childs
Attorney, Agent, or Firm—Felfe & Lynch

[57] ABSTRACT

A method for producing a transparent protective coating on a plastic optical substrate surface is disclosed. In particular, a substrate is positioned between two electrodes on the cathode in a reaction chamber. Once positioned, a noble gas is introduced into the chamber and the surface of the plastic optical substrate is bombarded. A monomeric organic compound of either siloxane or silazane is introduced into the reaction chamber and a bias voltage of a value in the range of 80 to 500 volts is obtained to polymerize the compound on the substrate surface. Following the beginning of this polymerization, oxygen is introduced into the reaction chamber in an amount of about 5 times the amount of the monomeric organic compound to form a mixture with the compound.

5 Claims, 1 Drawing Sheet

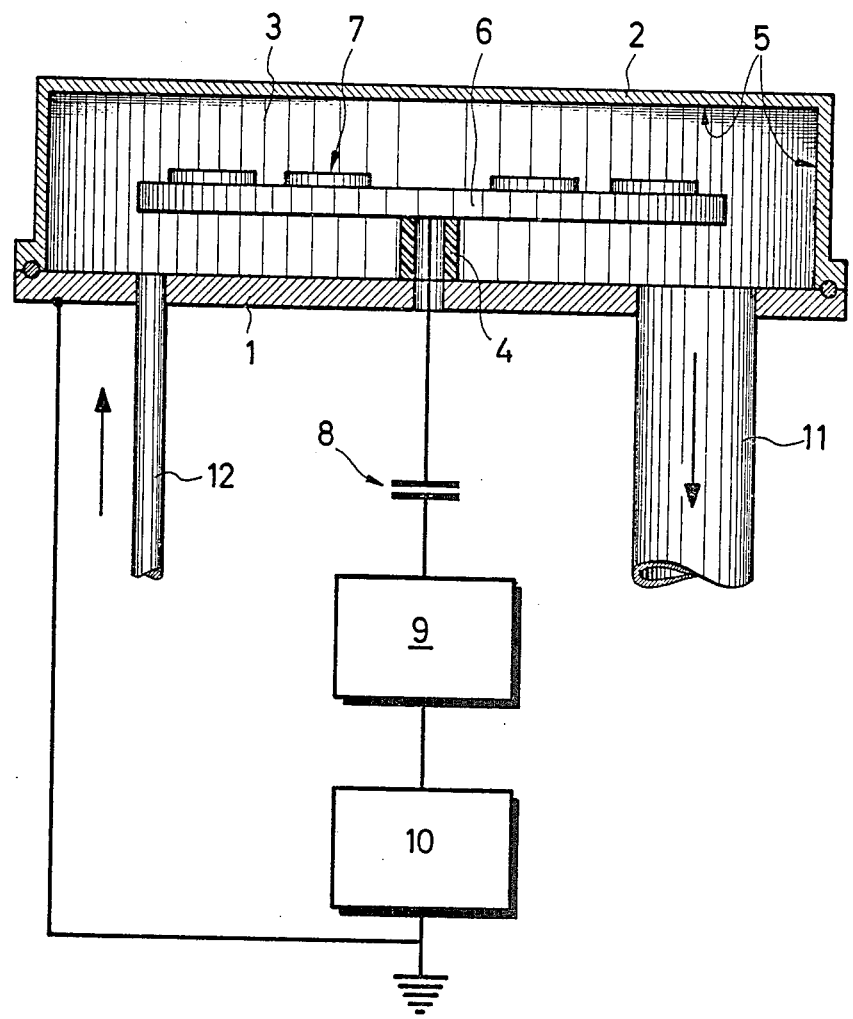

METHOD FOR PRODUCING TRANSPARENT PROTECTIVE COATINGS FROM SILICON COMPOUNDS

BACKGROUND OF THE INVENTION

The invention relates to a method for producing transparent protective coatings, especially on optical plastic substrates, by chemical vapor deposition by the action of a plasma (plasma CVD) on a polymerizable monomeric organic compound from the group of the siloxanes and silazanes, wherein oxygen is supplied in excess to the polymerization process.

DE-OS No. 34 13 019 (Federal Republic of Germany Application) discloses a method of the kind described above. This disclosure, however, is completely silent on the potential conditions on the substrates during the coating, and it is recommended, for the purpose of increasing the coating hardness, to add substances such as oxygen in the coating process which are said to increase the coating hardness. In order in this case to achieve sufficient strength of adhesion, however, it is furthermore prescribed that the substances increasing the hardness are not to be added until after the polymerization process has begun. A less than stoichiometric supply of oxygen at the beginning, however, results in brownish coatings. The object of the invention is to further improve the strength of adhesion and increase the coating hardness without complicating the performance of the process or having to accept brownish coatings.

The stated object is achieved in accordance with the invention, in the process described above, in that (a) the plasma is produced by means of radiofrequency between two electrodes of which one acts as a cathode, (b) the substrates are disposed on the electrode acting as cathode, (c) the substrates are exposed prior to the coating, in the absence of the organic compounds, to an ion bombardment by a glow discharge in an atmosphere containing a noble gas.

The two electrodes can be formed by the reaction chamber on the one hand and a substrate holder contained therein on the other, the substrate holder being connected to a radiofrequency generator through a capacitance and an impedance matching network. On account of the surface area ratios between the necessarily smaller substrate holder and the vacuum chamber surrounding it, a negative bias establishes itself on the substrate holder, so that it is given a cathode function. By this bias, which is superimposed on the radiofrequency voltage, positive ions are pulled from the plasma and accelerated toward the cathode. In this manner, solid and dense coatings are deposited on the substrates, and as a rule they are extremely hard due to the additional ion bombardment.

In connection with this, the composition of the gases or gas mixtures fed to the coating process is very important. If the measures prescribed according to the invention are not taken, brown coatings form at coating thicknesses above about 0.5 to 2 micrometers, and these are useless for optical applications since they strongly absorb the blue and violet parts of the visible spectrum.

By the measure of exposing the substrates before they are coated to a glow discharge in an atmosphere containing noble gas, in the absence of the organic compounds, an excellent preparation of the substrate for the coating that follows is achieved and leads to a great strength of adhesion.

It has especially been found that the coatings produced in accordance with the invention have excellent adherence to the CR 39, the trademark for polydiethylene allyl diglycol carbonate, commonly used for plastic eyeglasses and they easily withstand the conventional rubber eraser test.

The transition from the preparatory step of exposing substrates before coating to the actual coating process can be accomplished simply by turning on the feed of the monomeric organic compounds from the group of the siloxanes and silazanes, and of the oxygen, while at the same time shutting off the noble gas feed.

It is especially advantageous to use as the siloxane, the compound hexamethyldisiloxane, which has a relatively high vapor pressure. In conjunction with the usual process parameters, i.e., with an excess of oxygen, it is possible to produce coatings which are completely transparent in the visible range of the spectrum and which have an extraordinarily high microhardness of $HV_{0.01} = 1000$ Kp/mm$^2$. This hardness is to be compared with that of quartz, which has a hardness of 600 to 750 Kp/mm$^2$.

In accordance with the further invention, it is especially advantageous to set the bias voltage at levels between $-20$ and $-500$ V, preferably between $-80$ and $-250$ V, by selecting the input power.

When hexamethyldisiloxane and a bias voltage of about $-200$ V were used, the coating rate amounted to about 18 micrometers per hour or 5.0 nm/s. This rate is an average; higher coating rates can be achieved by increasing the pressure and/or the bias voltage.

The polymerization is preferably performed in the pressure range between $10^{-3}$ and 10 mbar.

The refractive index of the quartz-like coatings produced is in the neighborhood of that of quartz, and can be made slightly higher or lower by modifying the process parameters.

An example of the embodiment of an apparatus for the practice of the method according to the invention will be further explained herein with the aid of the single FIGURE of the drawing, which shows a vertical radial section through an apparatus that is to be operated batch-wise.

In the FIGURE there is shown a base plate 1 made of metal over which a reaction chamber 3 (vacuum chamber) is formed by a bell 2 placed thereon in a vacuum-tight manner. The wall surfaces of the reaction chamber 3 form a first electrode 5 which is at ground potential. A second electrode 6, which in the present case forms the substrate holder for a series of substrates 7, is supported on the base plate 1 through an insulator 4. From the second electrode 6 a conductor runs to a capacitor 8 and from there to an impedance matching network 9 which in turn is connected to a radiofrequency generator 10 which can have an output frequency between 100 kHz and 100 MHz. On account of the given surface area ratios, a negative bias voltage always lies at the second electrode, i.e., the substrates 7 laid upon it are at the cathode potential.

The reaction chamber 3 is evacuated through a vacuum connection 11 and it is supplied through a gas feed line 12 with a mixture of the reaction gases needed for the coating.

EXAMPLE 1

A coating apparatus in accordance with the FIGURE was first evacuated to a pressure of $5\times10^{-5}$ mbar. Then argon was introduced through a control valve and the gas feed line 12, and a gas pressure of $10^{-2}$ mbar was established. By applying a radiofrequency voltage of 13.56 MHz to the second electrode, a glow discharge was ignited and the bias voltage was set at $-450$ V ("sputter etching"). After 10 minutes a mixture of hexamethyldisiloxane (HMDS) and oxygen was introduced through another control valve, not shown, and the argon feed was shut off. The partial pressure was then $10^{-2}$ mbar in each case. The ratio of admixture of the two reaction gases remained unchanged from the beginning. The bias voltage was adjusted by setting the radiofrequency generator at $-450$ V. Over a coating time of 40 minutes, a brown coating 2.5 micrometers thick was deposited, whose microhardness amounted to about 1200 Kp/mm$^2$ (Vickers).

EXAMPLE 2

In another coating process, the partial pressures were set at $10^{-2}$ mbar for HMDS and $2\times10^{-2}$ mbar for $O_2$, and $-500$ V was selected as the cathode voltage. After a coating time of 32 minutes a yellow coating was obtained in a thickness of 5.8 micrometers and a microhardness of 1000 Kp/mm$^2$.

EXAMPLE 3

In another experiment, the partial pressures were set at $0.8\times10^{-2}$ mbar for HMDS and $3\times10^{-2}$ mbar for $O_2$, and the cathode voltage was again set at $-500$ V. At these parameters a light yellow coating 3.8 micrometers thick was obtained after a coating time of 20 minutes, with a microhardness of 1000 Kp/mm$^2$.

EXAMPLE 4

In an additional coating experiment, the oxygen excess was further increased. With partial pressures of $0.8\times10^{-2}$ mbar for HMDS and $4\times10^{-2}$ mbar for $O_2$ and the same cathode voltage of $-500$ V, a transparent, colorless coating 2.9 micrometers thick was obtained in 12 minutes with a microhardness of 1000 Kp/mm$^2$.

EXAMPLE 5

With the process parameters of Example 4, plastic boards of CR 39 with a thickness of 1 mm were coated. After the coating the boards were slightly warped. Coating the opposite side of these boards removed the warpage.

EXAMPLE 6

The coating experiment of Example 5 was repeated, except that the cathode voltage was lowered to $-100$ V. In this case the warping originally observed did not occur. The microhardness of such coatings fell to a value of 750 Kp/mm$^2$, which, however, is similar to the hardness of pure quartz and therefore is sufficient to make the CR 39 plastic as scratch-resistant as necessary for eyeglass lenses from this material. The coating properties are far superior to those of vapor-deposited quartz coatings.

EXAMPLE 7

A coating apparatus in accordance with the drawing was first evacuated down to a pressure of $5\times10^{-5}$ mbar. After the sputter etching described in Example 1, a gas mixture of hexamethyldisilazane and oxygen was introduced from the outset through control valves and the gas line 12, the partial pressures amounting to $10^{-2}$ mbar for hexamethyldisilazane and $5\times10^{-2}$ mbar for oxygen. By applying a radiofrequency voltage at a frequency of 13.65 MHz to the second electrode a glow discharge was ignited and the bias voltage was adjusted to $-400$ V by adjusting the radiofrequency generator. In a period of 15 minutes a transparent, colorless coating 1.8 micrometers thick was deposited, whose microhardness amounted to approximately 100 Kp/mm$^2$ (Vickers).

We claim:

1. A method for producing a transparent protective coating on a surface of a plastic optical substrate in a reaction chamber having at least two electrodes of opposed polarity, one of the electrodes functioning as a cathode, the method comprising the following steps:
   (a) positioning the substrate on the cathode in the reaction chamber;
   (b) introducing a noble gas into the reaction chamber;
   (c) exposing the surface of the plastic optical substrate to ion bombardment in the noble gas plasma, the ion bombardment being produced between the electrodes by a bias voltage formed at the cathode by a radiofrequency means;
   (d) introducing a monomeric organic compound into the reaction chamber comprising a member of the group of siloxane and silazane, the organic compound being polymerized by the plasma to coat the surface of the plastic optical substrates;
   (e) setting the bias voltage at the cathode at a value in the range of $-80$ to $-500$ volts; and
   (f) introducing oxygen into the reaction chamber during polymerization of the monomeric organic compound, the oxygen having a partial pressure of at least five times the partial pressure of the monomeric organic compound to form a mixture with the compound.

2. The method according to claim 1 wherein the siloxane is hexamethyldisiloxane of the formula:

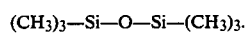

$(CH_3)_3-Si-O-Si-(CH_3)_3$.

3. The method according to claim 1, wherein the setting step (e) further comprises: setting the bias voltage of the cathode to a value in the range of $-80$ to $-250$ volts to produce the ion bombardment.

4. The method according to claim 1, wherein the monomeric organic compound is polymerized at a pressure having a range of $10^{-3}$ to 10 mbar.

5. The method according to claim 1, wherein the introducing of oxygen of step (f) further comprises: introducing oxygen into the reaction chamber having a partial pressure of at least five times higher than a partial pressure of the monomeric organic compound introduced into the reaction chamber.

* * * * *

UNITED STATES PATENT AND TRADEMARK OFFICE
CERTIFICATE OF CORRECTION

PATENT NO. : 4,762,730

DATED : August 9, 1988

INVENTOR(S) : Knut Enke, et al.

It is certified that error appears in the above-identified patent and that said Letters Patent is hereby corrected as shown below: Title page:

In the Abstract, line 9, "80 to 500" should be -- -80 to -500 --.

Signed and Sealed this

Fourth Day of April, 1989

Attest:

Attesting Officer

DONALD J. QUIGG

Commissioner of Patents and Trademarks